July 16, 1968

H. W. HOUSE 3,392,429

COMPOSITE LAMINATED RESILIENT MEANS FOR A PRESS MEANS

Filed June 10, 1966

INVENTOR.
HARVEY W. HOUSE
By Niketta, Glenny, Poms & Smith
ATTORNEYS.

July 16, 1968     H. W. HOUSE     3,392,429
COMPOSITE LAMINATED RESILIENT MEANS FOR A PRESS MEANS
Filed June 10, 1966     2 Sheets-Sheet 2

INVENTOR.
HARVEY W. HOUSE
By Miketta, Glenny, Poms & Smith
ATTORNEYS.

United States Patent Office 3,392,429
Patented July 16, 1968

3,392,429
COMPOSITE LAMINATED RESILIENT MEANS
FOR A PRESS MEANS
Harvey W. House, Pasadena, Calif., assignor to International Pipe and Ceramics Corporation, Los Angeles, Calif., a corporation of Delaware
Filed June 10, 1966, Ser. No. 556,645
6 Claims. (Cl. 25—45)

This invention relates generally to a resilient composite laminated shock means for a press means which may be utilized to rapidly punch and press material blanks from an intermittently movable strip of material, such as a pre-pressed ceramic composition. More particularly the invention relates to a novel construction of a composite laminated elastomeric resilient body member of cellular structure having force deformation characteristics affording effective rapid repetitive return of a die plate of a press means under production conditions.

The invention is described in relation to a press means such as shown in co-pending application Ser. No. 536,100, filed Mar. 21, 1966, in which such press means includes a top die member which, during a press stroke, advances downwardly through a strip of ceramic composition material to punch a material blank therefrom by advancement of the die member into a die cavity provided in a stationary case plate. Within the die cavity is a bottom die block which moves downwardly with the material blank sandwiched under virtually no pressure between the top and bottom die blocks. The bottom die block is carried by a movable bottom die plate which reaches the lower limit of its downward travel by metal-to-metal finished face abutment with a metal block carried on a fixed die shoe plate. When the bottom die plate is in contact with the metal block, the press stroke accomplishes desired further compression of the material blank and upon completion of the downward press stroke, the bottom die plate carrying the bottom die block returns the repressed blank to its upper initial position out of the die cavity for movement away from the press means.

In prior proposed press constructions, such a movable die plate has been returned to its normal upper position by means of mechanical springs, air or hydraulic cushioning means, or rubber bumper means. Such prior proposed means for returning such a bottom die block to its upper position have included several disadvantages. Mechanical springs under such continued production cycling will fatigue, break and will require continual maintenance. Moreover, mechanical springs are not solid and, as a result, dirt and various debris from the press operation and the ceramic composition material may collect beneath the bottom die plate and may lodge on metal contact faces of the metal block which provides a stop for travel of the bottom die block. Under such circumstances, the metal stop faces become worn, irregular, and control of pressure to be exerted on the material blank in the die cavity is lost. Air or hydraulic cushioning means present problems of control of forces applied to the movable bottom die plate, space limitations for such equipment are critical, and such means become complicated and expensive.

Solid rubber bumpers or cushions, that is, non-cellular or non-foamed, employed for this purpose, under conditions of rapid repetitive cycling, rapidly lose their elasticity and after a relatively short period in a production operation will not return the bottom die plate as quickly as desired. Moreover, such solid rubber bumpers or cushions are essentially non-compressible, deformation thereof is transmitted to edge boundaries, and excessive deformation forces accumulated at such boundaries caused material breakdown. Moreover, heat developed during the press operation may be transmitted to the rubber material and such repetitive compressing of the rubber material under such heat conditions deteriorates and breaks down the rubber material. In addition, rubber is often affected by hydraulic fluids used in connection with such press means and further damage to the rubber material may occur.

It has been found that when a unitary resilient body member of plastic foam material has been used for such a resilient means in a press means, the deformation of the resilient body member produced lateral spreading of the body member with consequent bulges of material at and around the edge regions of the body member. Such lateral distortion under repetitive cycling of the press member caused rapid fatigue-deterioration of the edge regions which developed tears, fractures and spalling. Such fractures gradually and progressively moved inwardly into the material until a portion of the material was split apart. Such failure of edge portions of the material produced different force-deformation characteristics of the material and as a result such continuous resilient body members or blocks were not satisfactory for production use.

The present invention contemplates for such a press means operation a novel composite resilient means which is characterized by extended long life, easy replacement, inexpensive to manufacture, and which provides an isolated or sealed environment for metal-to-metal contact surfaces which determine the bottom limit of travel of a movable die plate. The present invention generally contemplates a resilient means having a rectangular laminated body member of inert elastomeric cellular material such as polyurethane which provides a space filling means between opposed surfaces of a bottom die plate and a die shoe plate as well as having selected force-deformation and compression-set characteristics.

An object of the present invention therefore is to disclose and provide a novel composite laminated resilient means for use in a press means.

Another object of the invention is to provide a resilient elastomeric means for a press means wherein distortion of the resilient means in a lateral or sideward direction is minimized and restrained by non-stretchable means and whereby breakdown or fracture of the elastomeric material at edge regions thereof during long repetitive cycling use is effectively controlled and virtually eliminated.

A more specific object of the invention is to disclose and provide a novel laminated polyurethane pad or cushion construction for use in a press means or the like capable of resisting top die pressures and to effectively return bottom die members to their normal upper positions.

Various other objects and advantages of the present invention will be readily apparent from the following description of the drawings in which an exemplary embodiment of the invention is shown.

Figure 1:
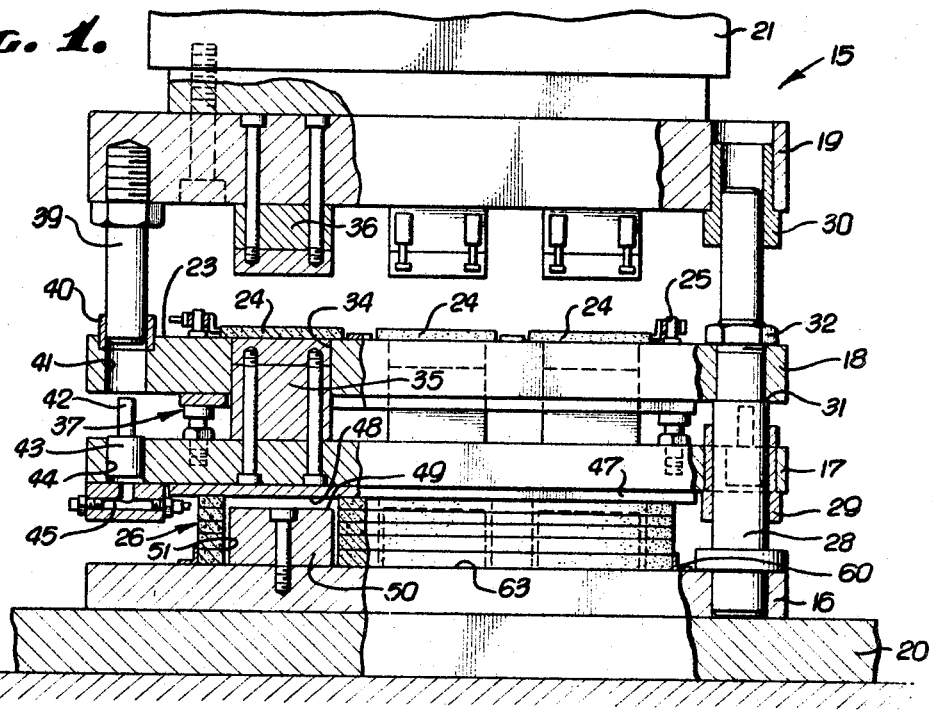
FIG. 1 is a fragmentary sectional view taken in a vertical plane of a press means in normal position and equipped with a resilient means of the present invention.
Figure 2:
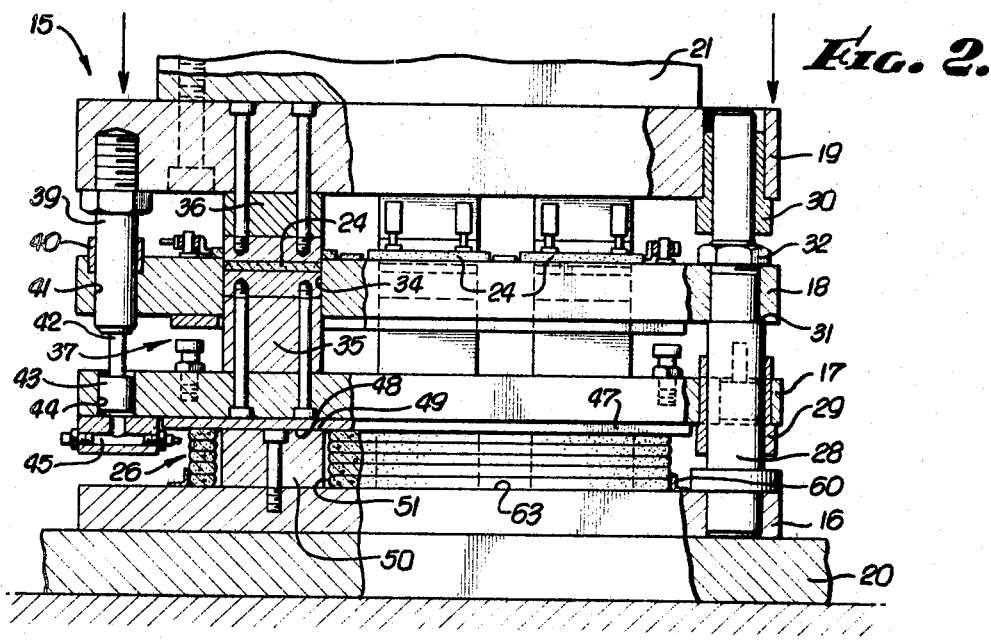
FIG. 2 is a view similar to FIG. 1 showing the press means at the bottom of a press stroke.

In FIGS. 1 and 2 there is exemplarily shown a press means generally indicated at 15 embodying the present invention and utilized for the rapid production of pressed ceramic composition bodies such as wall and floor tile and other formed articles. The press means 15 may be of a construction as shown in co-pending application Ser. No. 536,100 and may include a unitary removable assembly of a die shoe plate 16, a movable bottom die plate 17, a stationary die case plate 18 and a top die plate 19. The die shoe plate 16 may be supported and secured to a fixed press bed 20. The top die plate 19 may be secured to a press slide 21 which is reciprocally vertically movable by press actuating means of a well known press, such as a Bliss press. Within the unitary assembly, stationary die case plate 18 provides a press station having a top surface 23 across which material blanks 24 of a pre-pressed selected ceramic composition material may be intermittently moved by a carrier means 25 driven in timed relation with the press slide 21 as described in detail in said application Ser. No. 536,100. Between die shoe plate 16 and movable bottom die plate 17 is disposed a rectangular composite laminated resilient shock means 26 illustrating the present invention.

In further detail, the unitary assembly also includes a plurality of guide posts 28 located at each corner of the unitary assembly and supported from die shoe plate 16. On each post 28 a sleeve 29 provides a slide bearing for bottom movable die plate 17 and a top sleeve 30 provides a similar bearing for movable top die plate 19. Stationary die case plate 18 is fixed to each post 28 by a shoulder 31 and a threaded nut 32.

At the press station, the stationary plate 18 is provided with a plurality of through die cavities 34 into which extend bottom die block means 35 carried by the bottom plate 17. Above and in vertical alignment with each die cavity 34 is a top die block means 36 carried by top die plate 19. The upper position of bottom die block means 35 is determined by adjustable abutment means generally indicated at 37 and in such position the top surface of die block means 35 lies in the same plane as top surface 23 of stationary plate 18.

Downward movement of the top plate 19 and the top die block means 36, which is caused by downward movement of the press slide 21, is adjustably controlled by a push rod 39 provided at each side of the unitary assembly and guided through a sleeve bearing 40 aligned with a bore 41 formed in stationary plate 18. Aligned with each bore 41 is an upstanding pin 42 carried by a piston 43 provided in a cylinder chamber 44 in the bottom movable plate 17. The chamber 44 communicates with a pressure fluid line 45 for maintaining a selected pre-load fluid pressure on piston 43.

The movable bottom die plate 17 carries a wear plate 47 which includes a plurality of contact faces 48 each aligned with a top finished contact face 49 of a metal block 50 fixed to shoe plate 16. The resilient means 26 is provided with a opening 51 which receives each metal block 50 and which encircles each face 48 of wear plate 47.

Operation of such a unitary assembly to press a tile blank will facilitate understanding the function and operation of the resilient means 26. When press slide 21 commences its down stroke with a material blank 24 positioned over die cavity 34 and supported on the top surfaces of the bottom die block means 35 and stationary member 18, the top die block means 36 will be moved into a position spaced just above the material blank 24. At this position push rods 39 engage pins 42 causing the movable bottom plate 17 to then move downwardly in phase with top plate 19. In this manner, material blank 24 is relatively loosely sandwiched under virtually no pressure between the top and bottom die block means 36 and 35 so that crushing of the material blank is prevented. Thus as top die block means 36 and bottom die block means 35 move downwardly together and in phase, each material blank 24 is sheared by peripheral edges of the die cavity and a sheared tile blank is forced into die cavity 34. This downward motion of the sandwich arrangement continues until the bottom wear plate 47 contacts the top finished abutment faces 49 of the metal blocks 50. Previous longitudinal adjustment of the push rods 39 and top slide positioning means on the press means assures that this contact is made, for example 0.025 inch, above the bottom of the press means stroke. Thus as the press stroke continues downwardly, pressure is further exerted on upstanding pins 42 by push rods 39 and at a pre-selected force, fluid pressure under piston 43 is exceeded and fluid is forced from the bottom of cylinder 44 allowing the piston 43 to retract into cylinder 44. The top die block means is thus allowed to continue movement to the bottom of the press stroke while the motion of the bottom die block means is stropped about 0.025 inch above the bottom of the stroke. Pressure now exerted by the top die block means against the sandwiched tile blank causes it to deform under such pressure to completely fill the die cavity spacing lugs, smooth edges, and bottom pattern of a tile blank are formed. In such final pressing operation, the tile blank may be further compressed, by over travel of the top slide of the punch press, to a thickness of .275–.280 inch or other selected thickness. As the press stroke commences an upward direction, the resilient means 26 which has been placed under compression returns the movable bottom plate 17 to its upper position as indicated in FIG. 1.

Thus, in operation of the press means, the movable bottom plate or member 17 is initially biased by resilient means 26 into its upper position as limited by the stop means 37, and the resilient means 26 may be under selected pre-load compression, for example 4000 pounds pressure. On a press down stroke, resilient means 26 is further deflected and resists such downward movement of the bottom die member 17. On the press up stroke, the resilient means 26 elastically responds to positively resiliently urge the member 17 to its initial upper position. Under production conditions, such a press means may operate at from 40 to 80 cycles per minute and it therefore becomes apparent that a resilient means 26 is subject to continuous repetitive application of press forces which may vary between 4000 pounds to 10,000 pounds or more and which produce repetitive deflection of the material of the resilient means 26. The construction of a resilient means capable of long life under such production conditions is now described.

Figure 3:
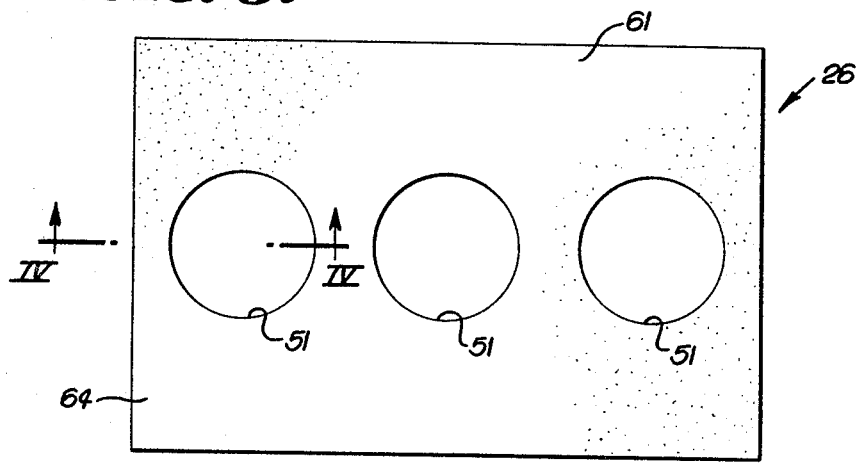
FIG. 3 is a top plan view of a resilient means embodying the invention and shown in FIGS. 1 and 2.
Figure 4:
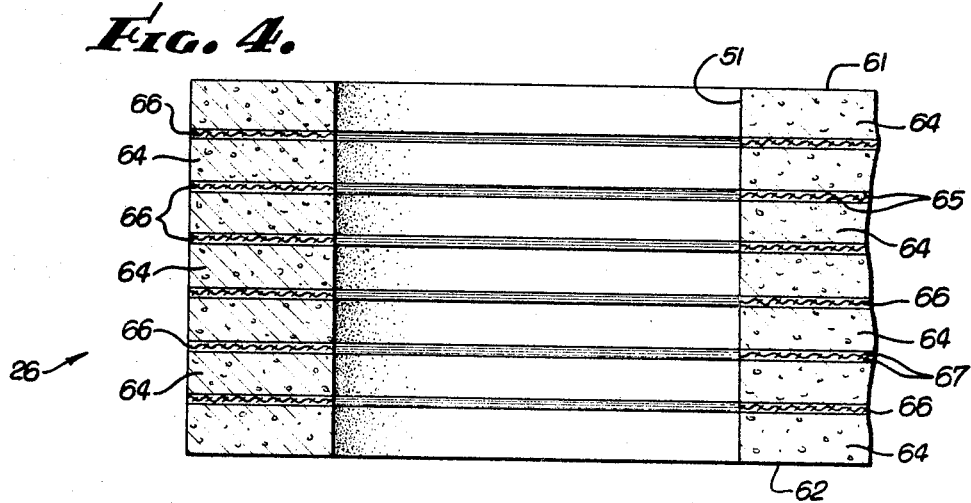
FIG. 4 is an enlarged fragmentary vertical sectional view taken in the plane indicated by line IV—IV of FIG. 3.
Figure 5:
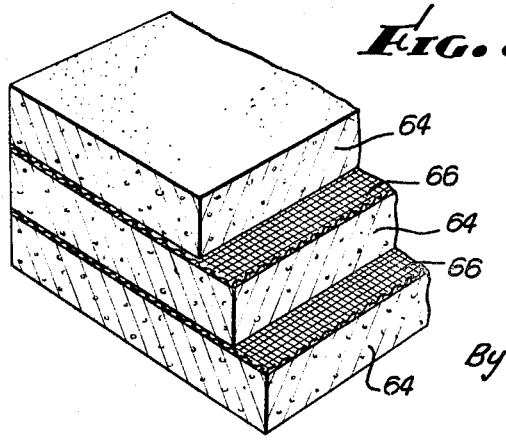
FIG. 5 is a fragmentary enlarged perspective view illustrating the construction of the laminated resilient means of this invention.

In FIGS. 3, 4 and 5, the resilient means 26 is shown in detail. Resilient means 26 may comprise a resilient body member of rectangular shape having a length and width slightly smaller than the length and width of bottom movable die plate member 17 so as to fit thereneath and between the corner posts 28. The resilient means 27 may be positioned on the bottom die shoe plate member 16 by peripheral molding angle-section strips 60 secured to the fixed die shoe member 16 by screws or other suitable means. The resilient means 26 includes the transversely aligned spaced openings 51 which receive the metal blocks 50. Top face 61 and bottom face 62 of resilient means 26 are planar and are sealingly pressed under a selected pre-load force against the opposed surfaces of wear plate 47 on the bottom movable member 17 and the top surface 63 of the fixed die shoe member 16.

Resilient means 26 includes a plurality of vertically stacked layers or laminae 64 of a synthetic polymer virtually chemically inert and having rubber-like characteristics, such as a flexible polyurethane foam having a density in the order of 28 pounds per cubic foot, plus or minus three pounds per cubic foot. The vertically stacked layers 64 may be cut or sliced from a unitary integral polyurethane foam block having overall dimenisons and thickness of the size desired to occupy the space between the die members 16 and 17. For example, for the press means shown, a unitary polyurethane foam block, in relaxed condition may be three and one-half inches thick, eleven inches wide, 21" long, and may be cut into one-half inch layers or laminae. Such slicing of the unitary foam member may be done on a large band saw and to obtain closely matching planar interfaces as indicated at 65 between adjacent laminae, each laminae may be flattened with a suitable grinding machine to provide parallel planar top and bottom faces and lamina of substantially uniform thickness.

Between the interfaces of laminae 64, a non-stretchable, pliant, flexible fabric means 66 having interstices may be interleaved to restrict and prevent lateral distortion or spreading of the laminae at the interfaces and portions of the laminae adjacent thereto when under pressure. The non-stretchable fabric means 66 may include a suitable pliant fiberglass fabric in sheet form of relatively coarse mesh and of a plain weave. An exemplary commercially available fabric may be a Thalco Uniglass fabric, 7.5 ounces. Other non-stretchable high tensile strength filaments or fabrics may be employed.

Fabric means 66 is secured to opposed interfaces 65 of adjacent laminae by adhesive means 67 which may comprise a strong, tough, non-flowing or non-creeping flexible two component type adhesive such as an epoxy resin having equal weights of a General Mills Versamid resin No. 25 and a Shell epoxy resin 820. The adhesive means may be applied by impregnating a slightly oversize sheet of glass fabric 66, coating opposed interfaces 65, and placing the impregnated sheet therebetween. A vertical stack of such laminae may be made and permitted to cure under pressure for a selected period at a selected temperature. After curing, the peripheral edge faces of the stack may be trimmed to proper dimensional size and through openings 51 cut in the laminated member.

When the solid polyurethane block is sliced into the several laminae 64, it is desirable that the laminae be stacked in the same sequence as cut from the initial block. It is also desirable that as the laminae are laid up one on top of the other, that the directions be alternated so as to balance any possible unevenness in the foam density of the initial solid block.

The elastomeric polyurethane foam may be of either open or closed cellular structure, the closed cellular structure being preferred to avoid possible partial saturation of surface portions of the laminae 64 by the adhesive means applied thereto. The vertical stack of laminae 64, fabric means 66 and the epoxy resin adhesive means 67 provides a three-dimensional continuous medium which will sustain repeated compressive cycling and recovery therefrom without deterioration of the material except after a very long life. The non-stretchable epoxy resin impregnated fabric means bonded to the interfacial portions of the polyurethane foam laminae, prevents lateral spreading of the laminae and provides in lateral directions virtually laterally rigid interfacial zones. The composite laminated resilient means 26 is virtually dimensionally stable in lateral directions while permitting the necessary deflection in vertical directions as caused by the press forces.

A composite laminated resilient elastomeric means 26 with openings therein constructed as described above, may have force-deformation which provide at a deflection of about one inch, a force yield of about 12,000 pounds. In this example, such a laminated pad may be pre-loaded in the press means under a force of about 4000 pounds which causes a pad deflection of approximately one-half inch. In press operation, when the movable die member 17 is in contact with metal blocks 50, the laminated pad may have a further deflection of about seven-sixteenths inch.

Such force-deformation characteristics may vary with respect to different press operations and the type of material being pressed. A selected desirable material for the laminated elastomeric shock pad includes polyurethane foam described above and may also include other synthetic and rubber-like materials of cellular or foam structure having selected capacity to rapidly fully recover from deformation, least fatigue under conditions of continuous cycling, and resistance to material deterioration under temperature and environmental conditions of use. Low compression set characteristics are desirable so that a uniform maximum return force is available during extended production conditions of use.

It will be understood that the dimensional size of the laminated pad may be varied as well as the number and thickness of the laminae. Density of the material may be varied depending upon the force deformation characteristics desired. It has been found that the effect of lamination, including openings in such pad, increases force-deformation of a nonlaminated block without holes or openings and of the same size and material by about 20%, while at the same time increasing life and use of the laminated construction.

It will also be understood that the adhesive means may include other suitable two-component adhesives such as resorcivol or phenolic glues or adhesive bonding compositions, such means having at least slight flexibility, and being non brittle and strong.

It will be understood that cooling means may be employed in either of the die members 16 and 17 in order to maintain the resilient means 26 at a suitable operating temperature such as between 70 to 140°, such cooling means being of assistance in extending further the life of the resilient pad.

It will be readily observed from FIGS. 1 and 2 that the laminated resilient means 26 substantially occupies most of the space between the movable press member 17 and affixed member 16 and that the top and bottom faces of the resilient means maintain sealed engagement with the press members so that the metal blocks 50 and the important contacting faces 49 and 48 are in a completely sealed environment.

Various modifications and changes may be made in the composite laminated resilient means described above and all such changes and modifications coming within the scope of the appended claims are embraced thereby.

I claim:
1. In a press means, the combination of:
a movable die member having an abutment face;
a fixed die member having an abutment face for contact with said movable abutment face to limit travel of the movable die member;
and laminated resilient means between said fixed die member and said movable die member for returning said movable member to one position;
said resilient means having an opening aligned with said abutment faces for receiving at least one of said faces;
said resilient means having surfaces in sealing contact with said fixed and movable die members for isolating said surfaces and for providing a sealed environment for said faces;
said laminated resilient means includes elastomeric laminae of polyurethane foam.

2. A press means as stated in claim 1 wherein said laminated resilient means includes a plurality of polyurethane laminae arranged in vertical stacked relation;
and non-stretchable flexible fabric means between interfaces of said stacked laminae;
and adhesive means bonding together said interfaces and said fabric means whereby lateral deformation of said laminated resilient means is restricted.

3. A press means as stated in claim 1 wherein said laminated resilient means includes
a plurality of elastomeric polyurethane closed cellular foam pads in stacked relation with planar interfaces;
a non-stretchable flexible fabric means between said interfaces;
and adhesive means impregnating said fabric means and bonding said interfaces with said fabric means for forming a non-stretchable interfacial laminae between adjacent pads.

4. A press means as stated in claim 3 wherein said polyurethane pads include a polyurethane material having a density in the order of 28 pounds per cubic foot.

5. A press means as stated in claim 4 wherein said adhesive means includes a rigid epoxy resin.

6. In a press means, the combination of:
a movable die member having an abutment face;
a fixed die member having an abutment face for contact with said movable abutment face to limit travel of the movable die member;
and laminated resilient means between said fixed die member and said movable die member for returning said movable member to one position;
said resilient means having an opening aligned with said abutment faces for receiving at least one of said faces;
said resilient means having surfaces in sealing contact with said fixed and movable die members for isolating said surfaces and for providing a sealed environment for said faces;
said laminated resilient means includes a plurality of laminae disposed parallel to said abutment faces, of uniform thickness and of elastomeric foam material; and a non-stretchable means disposed at interfaces of said laminae and bonded thereto.

References Cited

UNITED STATES PATENTS

| | | |
|---|---|---|
| 3,089,189 | 5/1963 | Feldman et al. |
| 3,166,332 | 1/1965 | Olson. |
| 3,172,928 | 3/1965 | Johnson. |
| 3,207,821 | 9/1965 | Jones-Hinton et al. |
| 3,238,566 | 3/1966 | Koehler. |
| 3,258,813 | 7/1966 | Groth et al. |
| 3,334,383 | 8/1967 | Irvine. |
| 3,341,895 | 9/1967 | Shelby. |

J. HOWARD FLINT, JR., *Primary Examiner.*